United States Patent [19]

Dinh

[11] Patent Number: 4,827,733
[45] Date of Patent: May 9, 1989

[54] INDIRECT EVAPORATIVE COOLING SYSTEM

[75] Inventor: Khanh Dinh, Alachua, Fla.

[73] Assignee: Dinh Company Inc., Alachua, Fla.

[21] Appl. No.: 110,420

[22] Filed: Oct. 20, 1987

[51] Int. Cl.⁴ .............................................. F25D 5/00
[52] U.S. Cl. ........................................ 62/305; 62/119;
62/196.3; 62/197; 62/310
[58] Field of Search ................. 62/119, 304, 305, 335, 62/310, 196.3, 197

[56] References Cited

U.S. PATENT DOCUMENTS

| | | | |
|---|---|---|---|
| 3,153,332 | 10/1964 | Goettl et al. | 62/176 |
| 3,191,396 | 6/1965 | Ruddock | 62/119 X |
| 3,744,264 | 7/1973 | Ware | 62/119 X |
| 3,747,362 | 7/1973 | Mercer | 62/171 |
| 3,789,617 | 2/1974 | Rannow | 62/119 X |
| 3,859,818 | 1/1975 | Goettl | 62/311 |
| 4,182,131 | 1/1980 | Marshall et al. | 62/91 |
| 4,295,342 | 10/1981 | Parro | 62/119 |
| 4,380,910 | 4/1983 | Hood et al. | 62/91 |
| 4,406,138 | 9/1983 | Nelson | 62/119 X |
| 4,505,327 | 3/1985 | Angle et al. | 165/48 R |

OTHER PUBLICATIONS

Article titled, "Indirect Evaporative Cooling Package", May/Jun. 1987 issue, *Engineered Systems*.

*Primary Examiner*—Lloyd L. King
*Attorney, Agent, or Firm*—Foley & Lardner, Schwartz, Jeffery, Schwaab, Mack, Blumenthal & Evans

[57] ABSTRACT

An evaporative cooling system is disclosed which uses a heat pipe device comprising first and second heat exchangers to transfer heat from the space being cooled to an evaporative cooler. Evaporative cooling is produced by passing atmospheric air over wet pads and the first heat exchanger. Evaporation of water removes heat from the atmospheric air and from the first heat exchanger containing refrigerant vapor, causing condensation of a portion of the vapor. The condensate moves to the second heat exchanger which contains liquid refrigerant. Room air is passed through the second heat exchanger and gives up heat to vaporize the liquid refrigerant. Vaporized refrigerant moves to the first heat exchanger where it is condensed as previously described. The cooled atmospheric air is then used to cool the condenser of a vapor compression machine, the evaporator of which is located in the flow path of the room air downstream of the heat pipe, further cooling the room air to desired conditions. Evaporative coolers using heat pipe devices and arranged in multi-stage configurations to produce greater cooling effects are also disclosed.

11 Claims, 5 Drawing Sheets

INDIRECT EVAPORATIVE COOLING SYSTEM

This invention relates to cooling systems and more particularly to cooling systems for use in a dry climate in which an evaporative cooling apparatus is used to indirectly cool air which is circulated into the conditioned space and is used to produce cool air which is circulated through the condenser of a vapor compression cooler. In either case, the air to be ultimately cooled, for example air in a living space, is cooled through an intervening heat exchanger rather than by direct contact with cooled, moistened outside air. This avoids two of the major disadvantages of evaporative cooling which are the introduction of moisture and large amounts of outside air into the cooled space.

It is well known in the prior art to cool and humidify dry outside air by passing it through a water evaporation apparatus and then to introduce the cool air into the space being cooled.

Evaporative coolers are very desirable because they provide cooling to the extent of 1000 BTUs per pound of water evaporated while requiring a relatively small amount of energy to produce the cooling. On the other hand, some of the water evaporated to produce cooling is entrained in the air which it is cooling and appreciably raises the humidity. Even in relatively dry climates, the added moisture can cause the air to become uncomfortably humid and reduce the effective feeling of comfort. As indicated above, this is an important disadvantage of evaporative cooling systems. To eliminate this disadvantage, this invention utilizes a heat pipe filled with a refrigerant to transfer heat from the room air to the outside air.

As used in this application, the term "heat pipe" is used to refer to a device in which lengths of finned tubes manifolded at both ends and connected to a finned coil are filled with a vaporizable heat transfer medium such as Freon or other refrigerant under pressure. The finned tubes are preferably located at a higher elevation than the finned coil so that gravity assists in circulating the refrigerant. The resulting device is then generally referred to as a gravity heat pipe. At equilibrium conditions, the refrigerant at the upper portion of the finned tubes or outdoor section of the heat pipe is in a vapor state and the refrigerant at the lower portion of the finned coil or indoor section of the heat pipe is in a liquid state. If the lower or liquid end of the circuit is heated, a portion of the liquid refrigerant is immediately evaporated and immediately rises to the upper or vapor end of the tube and if the vapor end of the tube is cooled, vapor is condensed and immediately drips down to the lower end of the circuit. Thus, the heat pipe circuit provides a very effective and quick-acting heat transfer device.

In this invention a heat pipe is incorporated which has its upper or vapor end in contact with the wet pads of an evaporative cooler and its lower or liquid end in the duct through which living space air is circulated for cooling. The vapor end of the heat pipe is cooled by the evaporation of moisture from the wet pads produced by passing dry outside air over the wet pads. Evaporation of the water removes heat from the vapor end of the heat pipe producing liquid Freon which migrates immediately to the lower end of the heat pipe by gravity. The lower or liquid end of the heat pipe is utilized as a heat exchanger to cool room air which is circulated over it. Thus the room air is cooled as it passes through the heat exchanger without increasing its humidity. Heat transferred from the room air to the liquid Freon in the lower end of the heat pipe vaporizes the Freon and causes it to rise immediately to the upper or vapor end of the heat pipe where it is again cooled by the evaporation of moisture from the wet pad. This process is repeated continually, effecting desired cooling of the room air. As explained below, this also results in cooling of the outside air used to produce evaporation of water from the wet pad. This cooled outside air may then be used to cool the condenser of a conventional vapor compression refrigeration machine. Under conditions when the evaporative cooling is not sufficient to produce the desired cooling of the room air, a vapor compression machine is used to produce further cooling and the moist, cooled air which passes over the outdoor section of the heat pipe is used to cool the condenser of the vapor compression machine before being exhausted to atmosphere. By using cooled air rather than ambient air to condense the compressed refrigerant, the efficiency of the vapor compression machine is increased. In addition, there may be some evaporation of moisture entrained in the air passing through the condenser of the vapor compression machine causing a still more effective cooling of the condenser. The evaporator section of the vapor compression cooler is located in the same duct as the liquid section of the heat pipe and downstream from it and further cools the living space air being circulated through the duct.

Another disadvantage of evaporative coolers is that they require that large amounts of air from the cooled space be discharged to atmosphere in order that more cooled outside air can be introduced through the evaporative cooler into the space to be cooled. This prohibits the simultaneous use of a vapor compression system and often requires two systems of ducts with complicated dampers to try to match the duct capacity to air handling requirements of the system of cooling being used.

Prior attempts to combine the efficiency of evaporative coolers with the effectiveness of vapor compression coolers generally require the selective operation of one or the other of the two machines and do not provide for simultaneous use of both. In some cases the vapor compression machine is used to cool the water to be evaporated to the dew point temperature or lower to limit the humidity of air introduced into the space to be cooled or even to lower its humidity. Other systems involve complicated ducting and damper systems which attempt to compensate for the difference in volume of air needed for effective cooling by evaporative cooling as compared to vapor compression cooling. In others, complicated control systems are also added to attempt to determine whether the evaporative system or the vapor compression cooling system is to be operated.

The present system avoids these complications and disadvantages by utilizing the evaporative cooling only in an indirect manner, that is, to provide cooling through a heat exchanger. Air is circulated from and back into the closed space being cooled through the same duct regardless of whether or not the vapor compression system is being used and the economical evaporative cooling system is used at all times since it does not adversely affect the humidity of the air being introduced into the cooled space. The indirect evaporative system and vapor compression systems work together simultaneously and complementary with each other in variable proportions which adjust automatically in accordance with atmospheric conditions.

SUMMARY OF THE INVENTION

The present invention utilizes a novel, compact combination vapor compression and evaporative cooling system of unitary construction which utilizes effective, efficient, low cost evaporative cooling at all times. The humidified outside air used to produce cooling is discharged to atmosphere and does not introduce humidity into the cooled space. During periods when sufficient cooling can be obtained by use of the evaporative cooler alone, the cooling capacity of the evaporative cooler is used to cool a heat transfer medium in a heat exchanger. The heat transfer medium is then passed through a second heat exchanger where it absorbs heat from the air in the space to be cooled. In periods when it is necessary to utilize a vapor compression cooler in addition to the evaporative cooler, cooled outside air which exits the first heat exchanger is used to cool the condenser of the vapor compression machine before it is exhausted to atmosphere. In effect, the evaporative cooler is used as a pre-cooler for the cooling air for the condenser of the vapor compression machine thereby increasing the efficiency and capacity of the vapor compression machine. The cooling coil or evaporator of the vapor compression machine is inserted in the cooling duct, downstream of the heat exchanger for the evaporative cooler, further cooling the air for the space which is desired to be cooled and dehumidifying it to a certain extent.

It should be understood that the system herein disclosed may be applied to condition air for a storage facility, for human comfort or to maintain conditions required for manufacturing or medical purposes. For ease of reference and understanding, the system will be shown and described as applied to cooling a room or living space to produce human comfort. This is not to be construed in any way as a limitation on the application of the system.

The system can be used either in the evaporative cooling mode alone or in the hybrid mode with both systems operating. The evaporative mode is designed to handle cooling requirements during off-peak seasons of the year without assistance from the vapor compression machine. Even in relatively hot climates it has been found that the evaporative cooler will handle the necessary heat load for about 50% of the year. If it is assumed that the evaporative cooler can produce a 10° Fahrenheit temperature drop in air circulated through its cooling coil, the duct work necessary to support a given capacity evaporative cooler will handle the air flow for a follow-up vapor compression evaporator of about twice the cooling capacity of the evaporative cooler.

It is an object of this invention to provide an indirect evaporative hybrid cooling system which uses a vapor compression cooling system to handle peak loads.

Another object of this invention is to provide an indirect evaporative hybrid cooling system capable of handling off-peak cooling loads without the need of assistance from the vapor compression section of the apparatus.

Another object of the invention is to provide an evaporative cooling system which avoids the introduction of humid air into the space being cooled.

Another object of the invention is to provide an evaporative cooling system which avoids the introduction of outside air into the space being cooled.

Another object of this invention is to provide an indirect evaporative cooling system which uses a heat pipe to transfer heat from the air being cooled to the outside air.

Still another object of the invention is to utilize evaporatively cooled outside air to cool the condenser of a conventional vapor compression machine thereby increasing the capacity and efficiency of the vapor compression machine.

Another object of this invention is to provide a hybrid cooling system utilizing an indirect evaporative cooler in combination with a vapor compression machine in which system both machines can be operated simultaneously in the same duct or either machine can be operated entirely independently of the other.

Yet another object of the invention is to provide an indirect evaporative cooling system which can utilize solar energy to reduce the cost of operation.

Another object of this invention is to provide an evaporative cooling system in which the temperature of the cooled air delivered to the space to be cooled is independent of the temperature of the outside air entering and leaving the evaporative cooler.

Still another object is to provide valve means for transforming the condenser and evaporator of a vapor compression cooling machine into the outdoor and indoor section respectively of a gravity heat pipe.

Another object of this invention is to provide a vapor compression cooling system capable of being used as a gravity heat pipe for cooling an indoor space when outdoor air is below a predetermined temperature.

Another object is to provide novel valve devices for bypassing the compressor and refrigerant metering devices of a vapor compression cooling machine and to convert it into a gravity heat pipe.

Yet another object of this invention is to provide an evaporative cooling system utilizing a heat pipe which system avoids the possibility of transferring heat from outdoor ambient air to the space which it is desired to cool.

Another object of this invention is to disclose an indirect evaporative cooling system which can be used as a gravity heat pipe effective to transfer heat from an enclosed space to outdoor ambient air without requiring the evaporation of water when the outdoor ambient air is below a predetermined temperature.

These and other objects, features and advantages of this invention will become apparent from the following description in conjunction with the accompanying drawing.

DESCRIPTION OF THE PREFERRED EMBODIMENT

Figure 1:
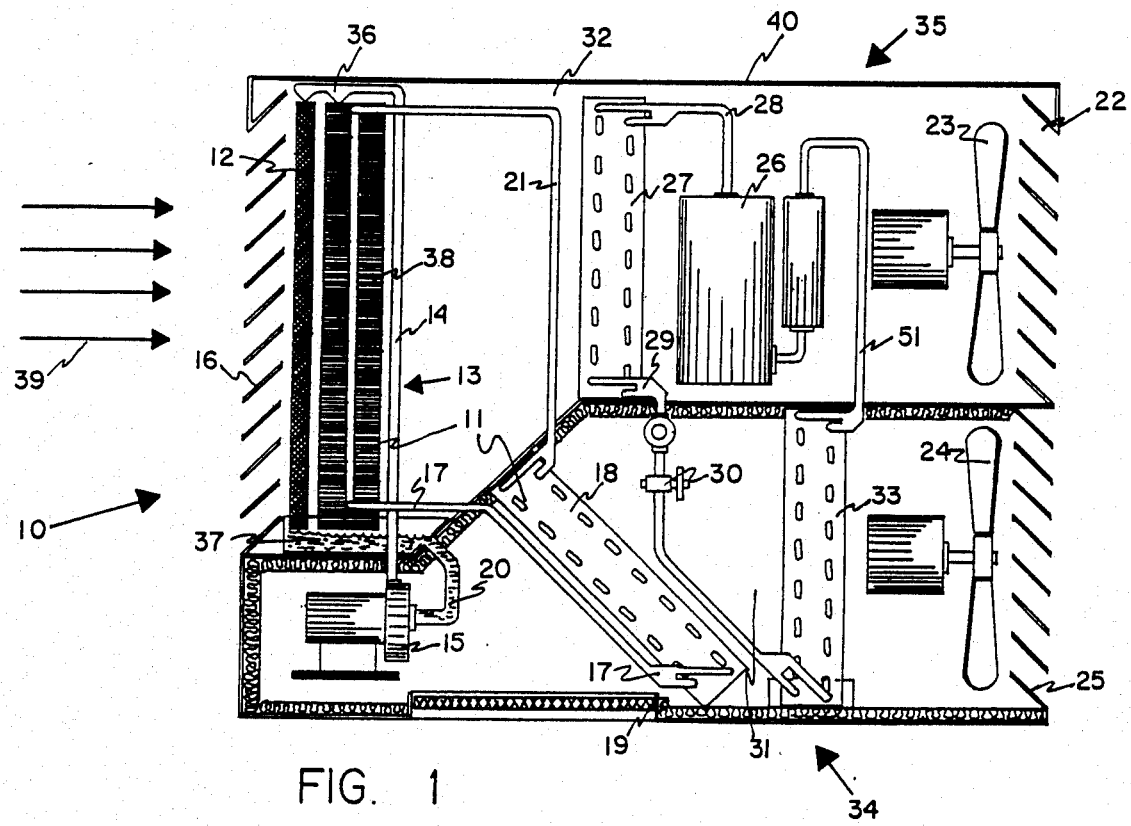
FIG. 1 is a schematic view of an indirect evaporative hybrid cooling system showing the principal operating parts.

FIG. 1 shows a cooling system 10 divided into an indoor air section 34 and an outdoor air section 35 generally divided by an insulated wall extending between them. The outdoor air section comprises the outdoor section 13 of a heat pipe 11 surrounded by and in contact with wet pads 12 which are kept moist by water delivered through tube 14 by pump 15. It further includes an outside air duct 32 which terminates in exhaust air port 22, and outside air fan 23. Suitable sensing devices and controls (not shown) are provided to maintain the pads 12 in a wet condition. Water not evaporated from pads 12 returns to the sump 37. Troughs or similar flow path devices 36 are provided at the top of the wet pads to keep water flowing at a controlled rate as required over the wet pads. Such devices and controls for them and for maintaining the water level in the sump are well known in the art and are not described herein.

Heat pipe 11 consists of an outdoor section 13 and an indoor section 18 charged with a refrigerant such as dichlorodifluoromethane commonly referred to by the trade name Freon 12. Under equilibrium conditions at least a portion of the refrigerant in the outdoor section 13 is in a vapor state and at least a portion of the refrigerant in the indoor section 18 is in a liquid state. As hot outside air passes over the outdoor heat exchanger or section 13 of the heat pipe, it evaporates moisture from the wet pad, cooling the heat pipe and also cooling the outside air. Heat taken from the heat pipe to evaporate the water also cools the Freon causing some of it to condense into a liquid. This liquid immediately transfers through tubing 17 to the liquid end of the indoor heat exchanger or section 18 of the heat pipe where it is available to cool room air which may be passed through it. Louvers or grates 16 are provided to allow the passage of air but not the entry of undesirable or destructive matter. The indoor and outdoor sections of the heat pipe 11 are actually in the form of finned tubing to provide good heat exchange.

It is well known to persons skilled in the art that the evaporative cooling section is subject to corrosion and deterioration due to the presence of water and hot, humid air. Therefore, the outdoor section of the heat pipe is preferably made of copper tubing with fins 38 of copper or other corrosion-resistant material. Water for the wet pads is supplied to pump 15 through pipe 20 from sump 37 which is maintained at the desired level by replenishing it from a suitable source of water. In areas where the water supplied is extremely hard, it may be advisable to soften the water with a suitable water softener to prevent scaling and/or other deposits which can cause clogging of the wet pad and tubing fins. It is also advisable to supply extra water to the wet pads to allow a runoff to wash the wet pad and tubing fins. A water runoff of 30% of the water supplied is suggested as the amount which will effectively reduce scaling and deposits. The outdoor section of the heat pipe is preferably constructed so that it can be cleaned mechanically of dirt, debris, corrosion and other deposits. When warm room air passes through the indoor section 18 of the heat pipe it gives up heat to the liquid Freon causing a portion of it to flash to a vapor. This vapor immediately transfers via tube 21 to the outdoor section 13 of the heat pipe. This vapor is cooled and condensed to a liquid by the evaporation of water from the wet pads as previously described. Hot, dry ambient air, indicated by the arrows 39 in the drawing, is drawn through the outdoor heat exchanger section of the heat pipe of the evaporative cooler by an outside air fan 23. This air is then exhausted to atmosphere through exhaust air port 22. Air from the space being cooled is circulated through the indoor section 18 of the heat pipe by a fan 24, which draws air through filter 19 and heat exchanger 18 and returns it into the room through the inside air port 25.

Rather than adding humidity to the indoor air as in a conventional evaporative cooling system, the system of this invention may extract moisture from the air as it passes through the heat exchanger 18. To reduce noise and increase the efficiency of air flow, fans 23 and 24 may actually be two or more fans in each case. All of the above described apparatus may be enclosed in a unitary housing 40.

As is apparent to persons skilled in the art, the system thus far described comprises an indirect evaporative cooling system which is capable of operating by itself and for at least a portion of the cooling season, providing all of the dehumidification and cooling necessary to maintain comfortable conditions. The capacity of the evaporative cooling apparatus can be designed to handle the cooling load to any desired level of the maximum cooling load required for the particular application. The ratio of evaporative cooling to vapor compression cooling desirable for a particular application would depend on various factors, such as the cost and physical size of the system, the cost of power and various other factors. It is suggested that in warm, arid portions of the United States for example, a system incorporating an evaporative cooling system capable of handling about one third of the maximum cooling load required, coupled with a vapor compression machine capable of handling the other two thirds, probably provides a suitable compromise.

As also indicated, the relatively low level of energy required for the water pump and air flow fans may be provided by solar energy, for example by a photovoltaic system. Photovoltaic systems are well known in the prior art and do not constitute any part of this invention and are not disclosed or described here.

The vapor compression portion of the equipment is of relatively standard design with the exception that the design air temperatures for the evaporator will be five to ten degrees cooler than customarily used and the temperatures for the condenser will be at least ten degrees cooler than those normally used for standard air-to-air machines, resulting in higher efficiencies.

As shown in FIG. 1, the vapor compression equipment includes a refrigerant compressor 26 and a condenser 27 which are located in the outside air section 35 of the system. Compressed gaseous refrigerant is conducted from the compressor to the condenser by pipe 28 and is cooled as it passes through the condenser by cool outside air whose temperature has been lowered by the evaporation of water as the air is drawn over the wet pads 12. Refrigerant leaves the condenser 27 as a liquid and is conducted to the evaporator 31 in the inside air section of the system through tubing 29. Liquid refrigerant vaporizes in the evaporator and returns to the compressor through pipe or tubing 51 taking heat from the air which passes through it. The flow of refrigerant through the evaporator is controlled by a metering device 30 such as an expansion valve. Conventional controls and accessories are also provided.

When the machine is operating in its hybrid mode, it can be seen that dry outside air is drawn through the louvers 16 and through wet pads 12 of the evaporative cooling apparatus by exhaust air fan 23. This causes evaporation of moisture in the wet pads cooling the refrigerant in the heat pipe 11 and also cooling the outside air. The cool outside air is drawn through the condenser 27 where it is used to cool the refrigerant which has been compressed by compressor 26, converting it to a liquid. The outside air is then exhausted through exhaust air port 22 to atmosphere. Cooling of outdoor section 13 of the heat pipe by evaporation of water in the wet pad causes condensation of a portion of the vaporized refrigerant in the heat pipe. This cooled, condensed refrigerant immediately travels into indoor section 18 of the heat pipe where it can be evaporated to produce cooling of room air which is drawn through filter 19 and heat exchanger 18 by inside air fan 25. Cooling by the evaporative cooler may produce a temperature drop of between five and ten degrees in the room air. As room air continues its movement through the inside air duct 31 it passes through the evaporator 33 of the vapor compression machine further cooling the inside air before it is returned to the room through inside air port 25.

As previously indicated, the inside and outside air ducts of the machine are designed to provide the air capacity necessary for the evaporative cooling section. The air handling capacity will then be more than enough to handle the air necessary for the vapor compression cooling portion of the machine. For example, assuming a total maximum cooling load of three tons or 36,000 BTUs per hour, with one third or one ton to be provided by evaporative cooling, it can be determined by empirical formulas that it will require air flow of 1200 cubic feet per minute to obtain one ton of indirect evaporative cooling if a 10° Fahrenheit temperature drop through the heat exchanger 18 is maintained. This air flow (1200 CFM) is commonly associated in the art with the flow necessary to obtain three tons of cooling with a vapor compression machine. Therefore, this duct will be more than adequate for a two ton vapor compression machine required to provide the additional maximum cooling desired. During hybrid operation the evaporative cooler will supply about one third of the cooling required and the vapor compression machine will supply the other two thirds.

Assuming a forced convection heat transfer coefficient of seven BTUs per hour per square foot of fin area per degree Fahrenheit of temperature differential, indoor heat exchanger 18 of the heat pipe must have a total fin area of approximately 170 square feet with the temperature differential between the air entering and leaving the heat exchanger maintained at 10° Fahrenheit.

Assuming a heat transfer coefficient of 500 BTUs per square foot of fin area for evaporative cooling when the wet pads are run wet, that is with excess water, then approximately 24 square feet of fin area is required for the outdoor heat exchanger 13 to produce one ton of cooling.

Figure 2:
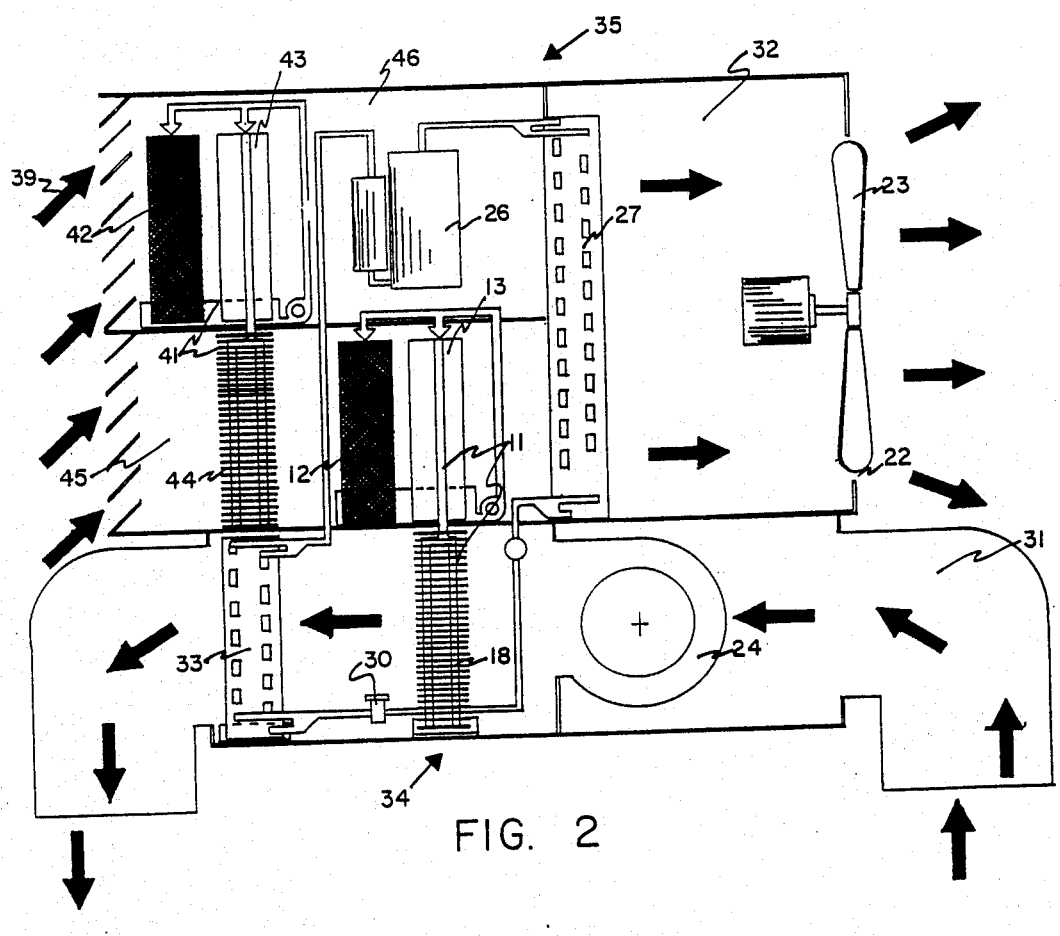
FIG. 2 is a schematic drawing showing a form of the invention similar to that shown in FIG. 1 but embodying a two-stage evaporative cooling system.

FIG. 2 shows a modified version of the system in FIG. 1 using a two-stage evaporative cooling portion. In FIG. 2 the indoor air section 34 is substantially the same as previously described and comprises the inside air fan 24, indoor section 18 of heat pipe 11, inside air duct 31 and evaporator 33 of a vapor compression machine. Outdoor air section 35 is also generally similar to the outdoor air section shown in FIG. 1 and comprises outside air duct 32, outside air fan 23, compressor 26 and condenser 27 of a vapor compression cooling machine and outdoor section 13 of heat pipe 11. However, in this case heat pipe 11 comprises the second stage of a two-stage evaporative cooling system that is able to produce a greater cooling effect than is possible in the version shown in FIG. 1. The first stage of the evaporative cooling section is provided by a heat pipe 41 which is associated with a wet pad 42. As can be seen in FIG. 2 hot, dry air indicated by the arrows 39 is drawn into the upper air duct 46 of outside air section 35 through wet pad 42 and the evaporation section 43 of heat pipe 41. The air is cooled by the evaporation of moisture and as previously described condenses Freon in the condensing section 43 of the heat pipe 41. The cooled air continues through the outside air duct 32 cooling condenser 27 of the vapor compression machine and is finally exhausted to atmosphere through exhaust air port 22. Cooled, condensed refrigerant in the condensing section of the heat pipe immediately passes to the evaporation section 44 of the heat pipe where it is available to pre-cool hot, humid air entering the lower air duct 45 of the outside air section 35 of the system. Pre-cooled outside air is further cooled as previously described in connection with FIG. 1 as it passes through wet pad 12 and outdoor air section 13 of heat pipe 11. Refrigerant in the indoor section 18 of heat pipe 11 is cooled to a lower temperature than in the system shown in FIG. 1 and produces greater cooling of room air which is circulated through the inside air duct 31.

Assuming that the system is operating in its hybrid mode and that outside air temperature is 100° Fahrenheit, typical operating parameters may be as follows:

Air entering the upper section 46 of the outside air duct would leave the outdoor section 43 of the heat pipe at about 70° Fahrenheit and would exit the condenser 27 of the vapor compression machine at about 100° to 110° Fahrenheit.

Air entering the lower section 45 of the outside air duct is pre-cooled to 80° Fahrenheit is it passes through the first-stage heat pipe evaporation section 44 and would be further cooled to 60° Fahrenheit as it passes through the wet pad 12 and the outdoor section 13 of heat pipe 11. This air would also leave the condenser 27 of the vapor compression machine at about 80° to 90° Fahrenheit and would cool the refrigerant in the heat pipe to a lower temperature and would have provided substantially greater cooling to the condenser of the vapor compression machine than is possible with the single-stage system of FIG. 1.

In the indoor air section of the hybrid multi-stage machine air would be drawn from the area being cooled at about 80° Fahrenheit and would be cooled to 65° Fahrenheit as it is passed through the indoor air section 18 of the heat pipe. It would be further cooled to about 55° Fahrenheit by the evaporator of the vapor compression machine and would be returned to the space being cooled at that temperature.

Figure 3:
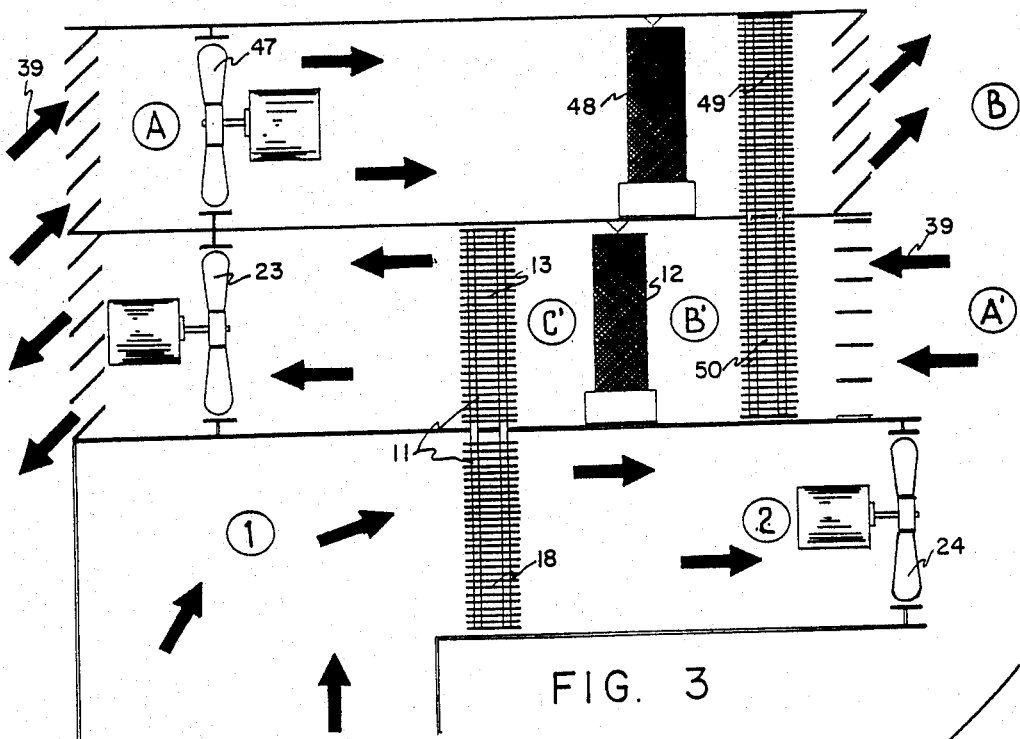
FIG. 3 shows a form of the invention which uses only a two-stage evaporative cooling system to produce cooling.

FIG. 3 shows a two-stage evaporative cooling only system. The system shown in FIG. 3 is substantially similar to that shown in FIG. 2 except that it omits the vapor compression machine. As seen in FIG. 3, a pre-cooling stage is provided comprising pre-cooling stage fan 47, pre-cooling stage wet pad 48, condensing section 49 of the pre-cooling stage heat pipe and evaporating section 50 of the pre-cooling stage heat pipe. The pre-cooling stage in FIG. 3 operates as previously described in connection with the first stage of the machine shown in FIG. 2. Pre-cooled outside air 39 thus is able to produce a lower temperature in the indoor section 18 of heat pipe 11 and therefore greater cooling of the room air circulated by fan 24.

Figure 6:
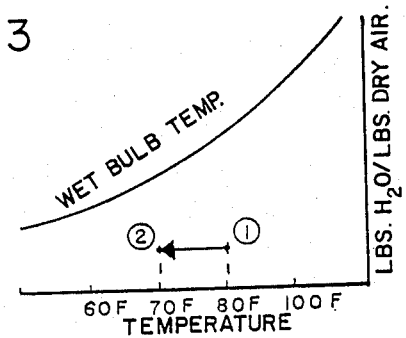
FIGS. 4, 5 and 6 are psychrometric graphs of each portion of the cooling system shown in FIG. 3.
Figure 4:
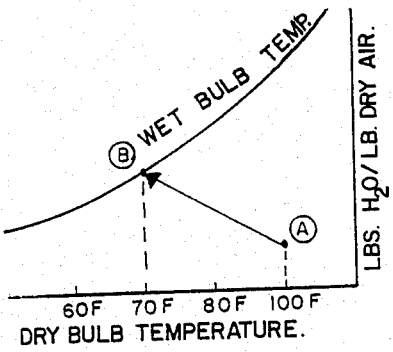
Figure 5:
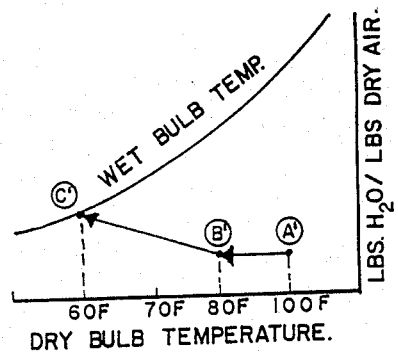

FIGS. 4, 5 and 6 are psychrometric graphs of theoretical conditions at locations marked A, B and A', B' and C' in FIG. 3 in the outdoor air section and locations 1 and 2 in the indoor air section. As seen in FIG. 4 relatively dry air at a temperature of 100° Fahrenheit at location A of the pre-cooling stage passes through the wet pad 48 and is cooled to approximately 70° Fahrenheit. It then passes through the condensing section 48 of the heat pipe and is discharged to atmosphere at location B.

FIG. 5 shows the conditions at A', B' and C' in the second stage of the evaporative cooling apparatus. There again relatively dry air at approximately 100° Fahrenheit at A' is cooled to approximately 80° Fahrenheit as it passes through the evaporating section 50 of the pre-cooling stage heat pipe to location B' without acquiring any additional moisture. The air then passes through the wet pad 12 taking up additional moisture and reaches location C' after being cooled to 60° Fahrenheit. This air is passed through the condensing section of heat pipe 11 then discharged to atmosphere. As indicated in FIG. 6, room air at location 1 at about 80° Fahrenheit is cooled to 65° Fahrenheit as it passes through heat exchanger 18 of heat pipe 11 and is circulated back into the room without having acquired any additional moisture.

Figure 7:
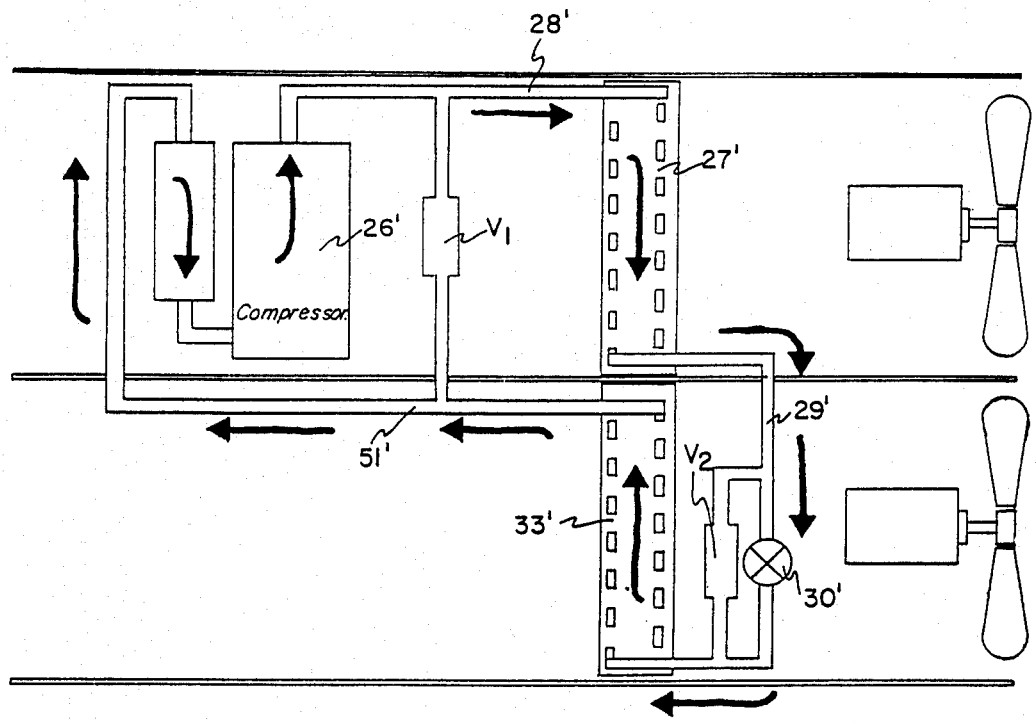
FIGS. 7 and 8 illustrate a vapor compression system constructed so that it can be converted to a gravity heat pipe cooling system.
Figure 8:
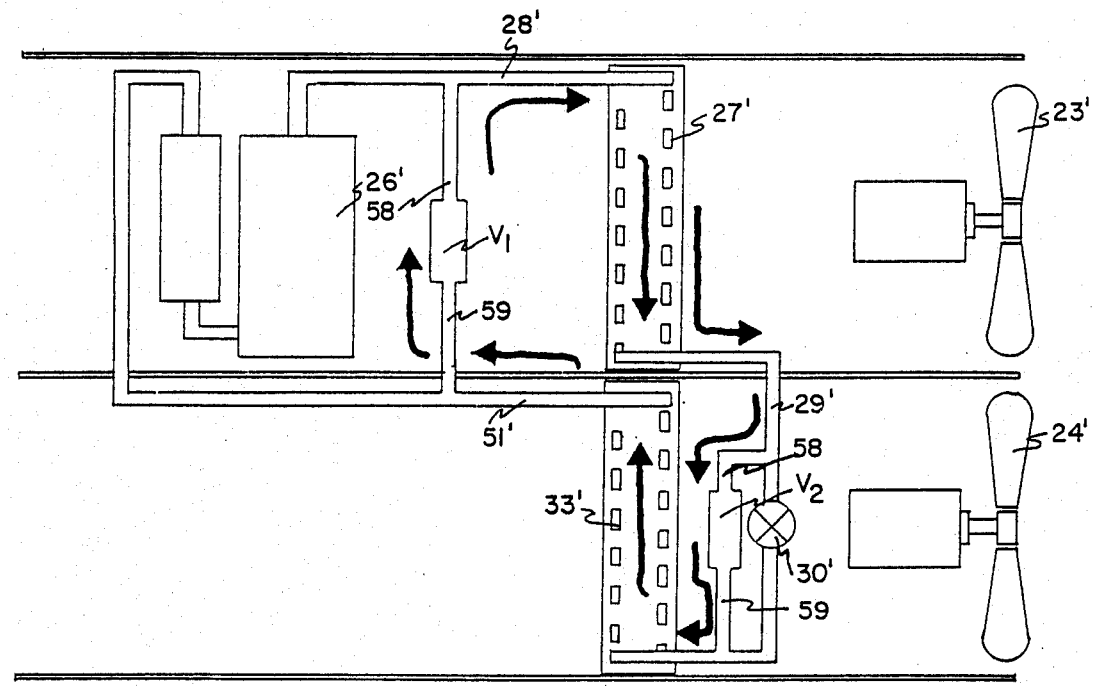

FIGS. 7 and 8 illustrate vapor compression system capable of being converted to a gravity heat pipe. FIG. 7 illustrates refrigerant flow in the vapor compression machine in its normal operating condition and FIG. 8 shows refrigerant flow when it operates as a heat pipe. When compressor 26' is running, vaporized refrigerant is compressed and is conducted via pipe 28' to condenser 27' where it is cooled and converted to a liquid which passes through pipe 29' and metering device or expansion valve 30' to the evaporator 33' where it is allowed to expand and convert to a vapor absorbing heat from the adjacent air and then return to the compressor via pipe 51'. As will be more fully explained hereinafter, valves V1 and V2 and the bypass paths through them are closed when compressor 26' is running. As shown in FIG. 8, however, when compressor 26' is not running, valves V1 and V2 are open providing a bypass around compressor 26', between pipes 28' and 51' and around the expansion valve 30' between pipe 29' and the evaporator 33'. In this condition the condenser 27' and evaporator 33' will operate as a heat pipe having an outdoor or condensing section 27' and an indoor or evaporating section 33'. As can be seen, with valves V1 and V2 open, refrigerant in the tubes of condenser 27' will be cooled and condensed by outside air drawn through the condenser by outside air fan 23' and the liquid refrigerant will pass through pipe 29' and valve V2 into the tubes of evaporator 33'. Liquid refrigerant in evaporator 33' will be evaporated by room air drawn through the evaporator by indoor air fan 24' cooling the indoor air. Evaporated refrigerant will flow from the evaporator through pipe 51', valve V1 and pipe 28' back to condenser 27'.

Figure 9:
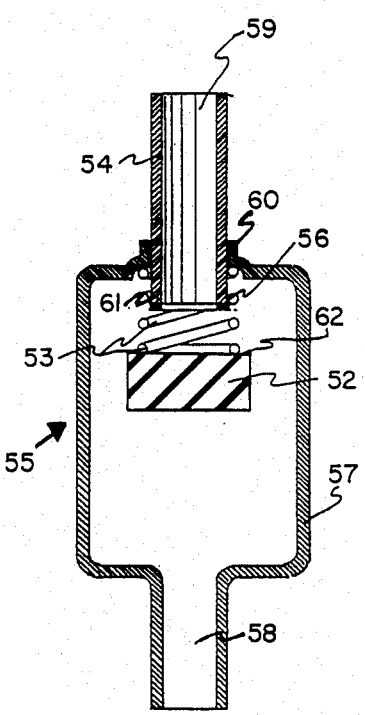
FIGS. 9 and 10 illustrate the open and closed positions of a novel form of valves which can be used in the system shown in FIGS. 7 and 8.
Figure 10:
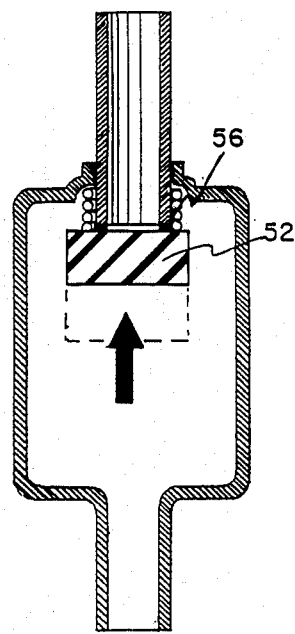

FIGS. 9 and 10 illustrate one form of valve which may be used to automatically open and close the bypass paths described in connection with FIGS. 7 and 8. As shown in FIG. 9 the valve is in its static normally open condition. As shown in FIG. 9 the valve 55 comprises a sealing disk or block 52, compression coil spring 53, tube 54 having a low pressure port 59 and annular sealing ring 56.

Valve 55 has a cylindrical body 57 which includes a high pressure port 58 suitable for securing by conventional means to the piping or tubing in which the valve is to be located. The valve body is suitably secured at 60 to a low pressure tube 54 which is suitable for securing to the piping circuit in which it is employed. The connection at 60 may be made by welding, soldering, cementing, or other means depending in part on the material from which the valve body and tube are made. The inner end 61 of tube 54 projects into the valve body 57 a substantial distance as shown in FIG. 9 and has secured to its inner end an annular seal 56 made of a plastic or elastomeric material so as to form a seat for sealing disk 52. Compression coil spring 53 has one of its ends encircling the inner end of the outlet tube and rigidly secured thereto as by welding, brazing, cementing or the like. The other or free end of spring 53 is permanently attached to sealing block 52 and normally supports the block in a position away from the seal or seat 56 so that fluid may flow readily from low pressure port 59 through the valve body and out of high pressure port 58. Compression spring 53 and the length of inner end 61 of the low pressure tube are so related that the sealing face 62 of block 52 will make contact with the seat 56 and effect a good seal before the spring 53 is fully compressed.

FIG. 10 shows the sealing block in its fully closed and seated position. The position of sealing disk 52 in its normal open position are shown by dotted lines in FIG. 10.

The valve operates automatically in response to whether or not compressor 26' is running in the following manner:

When compressor 26' is not running the parts will assume their normal static condition as shown in FIG. 9 in which the valve 55 is open and fluid may flow freely from low pressure port 59 through the valve and out port 58 by-passing the compresser and expansion valve 30' and permitting the condenser and evaporator of the vapor compression machine to operate as a heat pipe. While compressor 26' is operating, pressure will appear at port 58 of each of the valves V1 and V2 as indicated in FIGS. 8, 9 and 10 causing the valve sealing block 52 to compress spring 53 until it contacts sealing ring 56 preventing the flow of fluid through the valve. As indicated above, the spring 53 is of relatively light resistance and the valve would be closed as soon as pressure is generated by the compressor 26'.

It can be seen that this invention has provided an effective and improved indirect evaporative cooling system. It is to be understood that the invention disclosed herein is not limited to the details of construction and arrangement of parts illustrated in the accompanying drawings but is capable of being practiced or carried out in various ways. Furthermore, the terminology and examples employed herein are for the purpose of description only and are not to be considered limitations.

It is obvious to those skilled in the art that although the invention has been shown and described in a limited number of preferred embodiments, many variations may be made in the forms and structures here presented without departing from the scope of the invention as set forth in the appended claims.

What is claimed is:

1. In an indirect evaporative cooling system for cooling air in an enclosed space, a heat transfer system comprising first and second heat exchangers, said first and second heat exchangers in turn comprising a heat pipe, said heat exchangers being filled with refrigerant, at least a portion of the refrigerant in the first heat exchanger being in a vapor state and at least a portion of the refrigerant in said second heat exchanger being in a liquid state under equilibrium conditions, a source of water, a source of outside air, means for circulating water and outide air from said sources over said first heat exchanger whereby at least some of the water is evaporated and heat is transferred from the refrigerant to the evaporating water and means for circulating air from said enclosed space through said second heat exchanger whereby to transfer heat from the air in the enclosed space to the refrigerant.

2. A cooling system as set forth in claim 1 wherein said first and second heat exchangers comprise at least one tube closed at each end, each of said tubes having a relatively extensive exposed heat exchange surface, the corresponding first ends of said tubes forming said first heat exchanger and the corresponding other ends of said tubes forming said second heat exchanger.

3. A cooling system as set forth in claim 1 wherein said first heat exchanger lies in a first duct and said second heat exchanger lies in a second duct isolated from the first duct, whereby the air in the enclosed space is cooled without introducing any outside air or moisture into the enclosed space.

4. A cooling system as set forth in claim 1 wherein said first and second heat exchangers comprise a gravity heat pipe and said first heat exchanger is located in a position vertically above the position of the second heat exchanger whereby the heat pipe will not operate to transfer heat from the outside air to the air in the enclosed space.

5. A cooling system as set forth in claim 3 further comprising a vapor compression cooling machine, the condenser of said vapor compression cooling machine being located in said first duct and the evaporator of said vapor compression cooling machine being located in said second duct whereby said condenser is cooled by outside air which is circulated through said first heat exchanger and said evaporator absorbs heat from air from the enclosed space which is circulated through said second heat exchanger.

6. A cooling system as set forth in claim 1 further comprising a vapor compression cooling machine having a condenser and an evaporator, means for directing outside air which has passed through said first heat exchanger over said condenser to cool the refrigerant therein and further means for directing air from said enclosed space which has passed through said second heat exchanger over said evaporator to further cool the air from said enclosed space.

7. In an indirect evaporative cooling system for cooling air in an enclosed space, a heat transfer system comprising first, second, third and fourth heat exchangers, said first and second heat exchangers in turn comprising a first heat pipe and said third and fourth heat exchangers comprising a second heat pipe, said heat exchangers being filled with a refrigerant and at least a portion of the refrigerant in the first and third heat exchangers being in a vapor state and at least a portion of the refrigerant in said second and fourth heat exchangers being in a liquid state under equilibrium conditions, a source of water, a source of outside air and means for circulating water and outide air from said sources over said first and third heat exchangers whereby at least some of the water is evaporated and heat is transferred from the refrigerant to the evaporating water and means for circulating air from said enclosed space through said second heat exchanger whereby to transfer heat from the air in the enclosed space to the refrigerant.

8. A cooling system as set forth in claim 7 comprising further means for first circulating over the second heat exchanger the outside air which is to be circulated over the third heat exchanger.

9. An apparatus, comprising:
a vapor compression cooling machine comprising a compressor, a condenser, a metering device and an evaporator; and
means for providing a path for refrigerant bypassing the compressor and metering device, said means being responsive to pressure from said compressor for closing said path so that the machine acts as a compression cooling machine and being responsive to a lack of pressure from said compressor for opening said path for providing an evaporative cooling machine using said condenser and said evaporator.

10. The invention described in claim 9 in which said means comprise a normally open valve.

11. The invention described in claim 10 in which said valve comprises a valve body having a high-pressure port and a low-pressure port and providing a flow path between said high-pressure port and said low-pressure port, a valve seat, a valve disk movable into contact with said valve seat to close the flow path through said valve between said low-pressure port and said high-pressure port and spring means supporting said valve disk and biasing it toward its normally open position.

* * * * *